United States Patent
Shah et al.

(10) Patent No.: US 7,779,295 B1
(45) Date of Patent: Aug. 17, 2010

(54) METHOD AND APPARATUS FOR CREATING AND USING PERSISTENT IMAGES OF DISTRIBUTED SHARED MEMORY SEGMENTS AND IN-MEMORY CHECKPOINTS

(75) Inventors: Veeral Shah, Maharashtra (IN); Milind Borate, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 515 days.

(21) Appl. No.: 11/239,766

(22) Filed: Sep. 30, 2005

Related U.S. Application Data

(63) Continuation-in-part of application No. 11/167,962, filed on Jun. 28, 2005.

(51) Int. Cl.
   *G06F 11/00* (2006.01)
(52) U.S. Cl. .................... 714/6; 714/7; 714/13
(58) Field of Classification Search ............ 714/6, 714/7, 13, 12
   See application file for complete search history.

(56) References Cited

U.S. PATENT DOCUMENTS

| | | | | |
|---|---|---|---|---|
| 5,333,314 A | * | 7/1994 | Masai et al. ............... | 707/202 |
| 5,630,047 A | * | 5/1997 | Wang ........................ | 714/15 |
| 5,802,267 A | * | 9/1998 | Shirakihara et al. ......... | 714/15 |
| 5,922,078 A | * | 7/1999 | Hirayama et al. ........... | 714/16 |
| 6,052,695 A | * | 4/2000 | Abe et al. .................. | 707/202 |
| 6,360,331 B2 | * | 3/2002 | Vert et al. .................. | 714/4 |
| 6,460,055 B1 | * | 10/2002 | Midgley et al. ............. | 707/204 |
| 6,823,474 B2 | * | 11/2004 | Kampe et al. ............... | 714/13 |
| 7,069,401 B1 | | 6/2006 | Noonan et al. | |
| 7,139,887 B2 | * | 11/2006 | Colgrove et al. ............ | 711/162 |
| 7,162,662 B1 | * | 1/2007 | Svarcas et al. .............. | 714/15 |
| 2005/0187992 A1 | * | 8/2005 | Prahlad et al. .............. | 707/204 |
| 2007/0277056 A1 | * | 11/2007 | Varadarajan et al. ......... | 714/15 |

* cited by examiner

*Primary Examiner*—Philip Guyton
(74) *Attorney, Agent, or Firm*—Moser IP Law Group

(57) ABSTRACT

A method and apparatus that enable quick recovery from failure or restoration of an application state of one or more nodes, applications, and/or communication links in a distributed computing environment, such as a cluster. Recovery or restoration is facilitated by regularly saving persistent images of the in-memory checkpoint data and/or of distributed shared memory segments using snapshots of the committed checkpoint data. When one or more nodes fail, the snapshots can be read and used to restart the application in the most recently-saved state prior to the failure or rollback the application to an earlier state.

20 Claims, 5 Drawing Sheets

METHOD AND APPARATUS FOR CREATING AND USING PERSISTENT IMAGES OF DISTRIBUTED SHARED MEMORY SEGMENTS AND IN-MEMORY CHECKPOINTS

CROSS-REFERENCE TO RELATED APPLICATIONS

This application is a continuation-in-part of co-pending U.S. patent application titled "PERSISTENT IMAGES OF DISTRIBUTED SHARED MEMORY SEGMENTS AND IN-MEMORY CHECKPOINTS", U.S. patent application Ser. No. 11/167,962, filed Jun. 28, 2005. The aforementioned related patent application is herein incorporated by reference.

BACKGROUND OF THE INVENTION

1. Field of the Invention

The invention generally relates to computer systems and, more particularly, the invention relates to high-availability computer systems that utilize in-memory checkpointing.

2. Description of the Background Art

Networked computer systems enable users to share resources and services. One computer can request and use resources or services provided by another computer. The computer requesting and using the resources or services provided by another computer is typically known as a client, and the computer providing resources or services to another computer is known as a server.

A group of independent network servers may be arranged in a cluster. Servers in a cluster are organized so that they operate and appear to clients as if they were a single unit. A cluster and its network may be designed to improve network capacity by, among other things, enabling the servers within a cluster to shift work in order to balance the computing load. By enabling one server to take over for another, a cluster may be used to enhance stability and minimize downtime caused by an application or system failure.

Today, networked computer systems including clusters are used in many different aspects of our daily lives. They are used, for example, in business, government, education, entertainment, and communication. As networked computer systems and clusters become more prevalent and our reliance on them increases, it has become increasingly more important to achieve the goal of continuous availability of these "high-availability" computer systems.

High-availability computer systems need to detect and recover from a failure in a way transparent to its users. For example, if a server in a high-availability computer system fails, the system should detect and recover from the failure with no or little impact on clients.

Various methods have been devised to achieve high availability in networked computer systems including clusters. For example, one method known as triple module redundancy, or "TMR," is used to increase fault tolerance at the hardware level. Specifically, with TMR, three instances of the same hardware module concurrently execute and, by comparing the results of the three hardware modules and using the majority results, one can detect a failure of any of the hardware modules. However, TMR does not detect and recover from a failure of software modules. Another method for achieving high availability is software replication, in which a software module that provides a service to a client is replicated on at least two different nodes in the system. While software replication overcomes some disadvantages of TMR, software replication suffers from its own problems, including the need for complex software protocols to ensure that all of the replicas have the same state.

Replication of hardware or software modules to achieve high-availability raises a number of new problems including management of replicated hardware and software modules. The management of replicas has become increasingly difficult and complex, especially if replication is done at the individual software and hardware level. Further, replication places a significant burden on system resources.

When replication is used to achieve high availability, one needs to manage redundant components and have an ability to assign work from failing components to healthy ones. However, telling a primary component to restart or a secondary component to take over is not sufficient to ensure continuity of services. To achieve a seamless fail-over, the successor needs to resume operations where the failing component stopped functioning. As a result, secondary components need to know the last stable state of the primary component.

What is needed is a way to quickly recover from failure of one or more nodes, applications, and/or communication links in a distributed computing environment, such as a cluster. Preferably, an application that was running on the failed node can be restarted in the state that the application had before the node failed. These capabilities should have little or no effect on performance of applications.

SUMMARY OF THE INVENTION

The present invention enables quick recovery from failure of one or more nodes, applications, and/or communication links in a distributed computing environment, such as a cluster. An application that was running at the time of failure can be restarted in the state that the application had before the failure or can be "rolled back" to a prior state. Recovery is facilitated by ensuring that multiple nodes in the distributed environment or cluster are periodically synchronized to have consistent in-memory checkpoint images. Maintaining consistent checkpoint images across all nodes in the cluster enables the in-memory checkpoint image from other nodes to be used to recover the application on a failed node.

Recovery is also facilitated by regularly saving persistent images of the in-memory checkpoint data including distributed shared memory segments. These persistent images are sequential snapshots of the committed checkpoint image that are stored on a disk within the file system and/or volume manager. The snapshots capture each change to the committed checkpoint image. The snapshots are written asynchronously so that applications can continue to write data even during creation and with minimal effect on application performance. Furthermore, multiple updater nodes can simultaneously create snapshots using synchronization operations. Each snapshot is related to a transaction identifier number to identify a point in time at which the snapshot was created. These snapshots provide a historical record of the changes that were made to the persistent checkpoint image. When one or more nodes fail, the checkpoint image snapshots can be read and used to restart the application in the most recently-saved state prior to the failure or any point in time prior to the failure. The checkpoint image snapshots can also be used to initialize the state of the application in a new node joining a distributed computing environment.

BRIEF DESCRIPTION OF THE DRAWINGS

The present invention may be better understood, and its numerous features and advantages made apparent to those skilled in the art by referencing the accompanying drawings.

The use of the same reference symbols in different drawings indicates similar or identical items.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

The present invention enables quick recovery from failure of one or more nodes, applications, and/or communication links in a distributed computing environment, such as a cluster. An application that was running at the time of failure can be restarted in the state that the application had before the failure and/or rollback the state of the server to an earlier time. Recovery is facilitated by ensuring that multiple nodes in the distributed environment or cluster are periodically synchronized to have consistent in-memory checkpoint images. Maintaining consistent checkpoint images across all nodes in the cluster enables the in-memory checkpoint image from other nodes to be used to recover the application on a failed node.

Recovery is also facilitated by regularly saving persistent images of the in-memory checkpoint data. The persistent images comprise a sequence of snapshots of committed checkpoint data. The snapshots are written asynchronously so that applications can continue to write data even during creation of each snapshot and with minimal effect on application performance. Furthermore, multiple updater nodes can simultaneously create snapshots using synchronization operations. When an entire cluster fails, the checkpoint image snapshots can be read and used to restart a server in the most recently-saved state prior to the failure or any prior state. The checkpoint image snapshots can also be used to initialize the state of a new node joining the distributed computing environment or roll back the state of the computer system to a state that existed at an earlier point in time.

Figure 1:
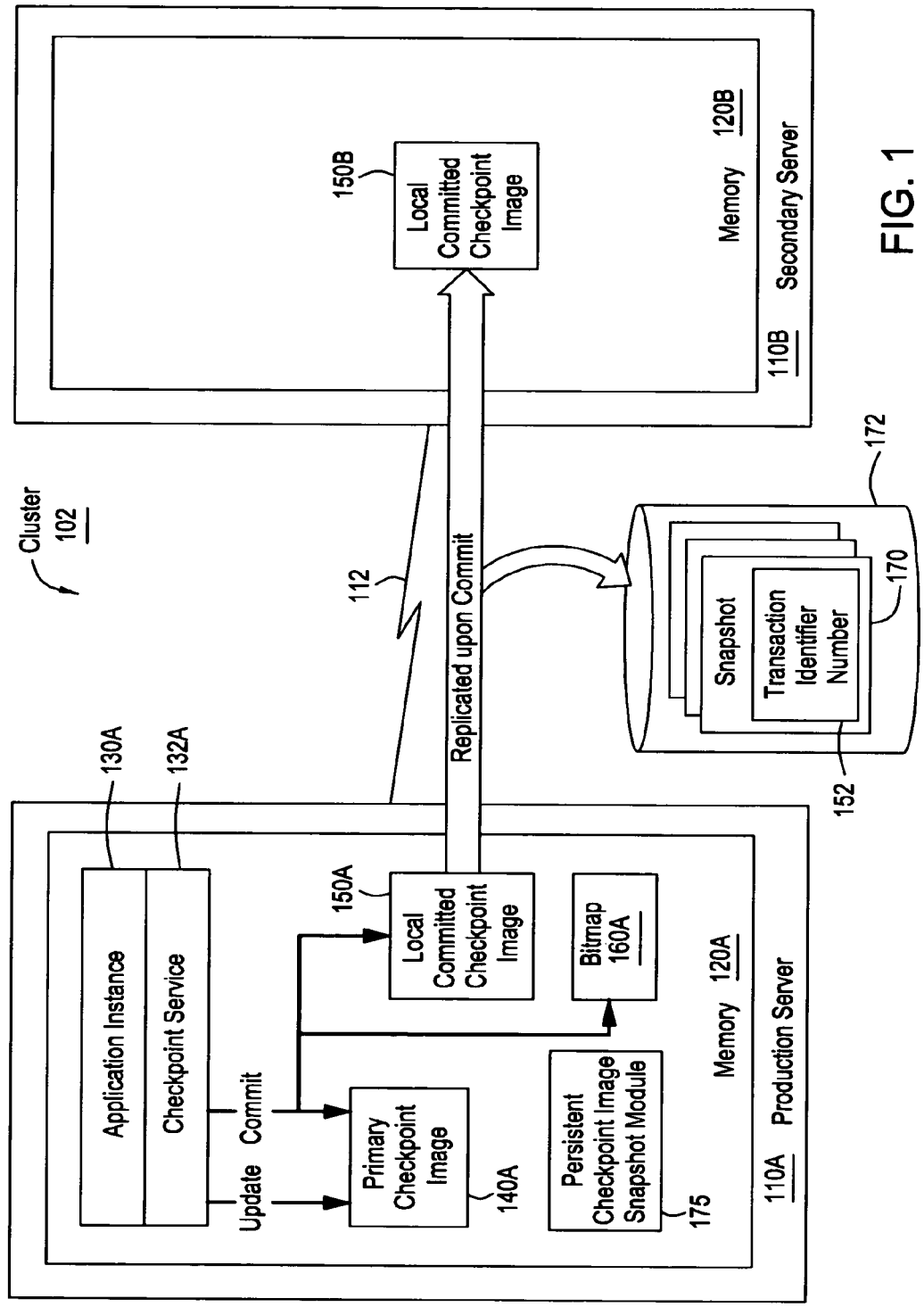
FIG. 1 is a diagram of an environment in which the present invention may be used.

FIG. 1 is a diagram of an example environment in which the present invention may be used. In this example environment, a cluster 102 comprises two nodes, production server 110A and secondary server 110B. Servers in cluster 102 are connected via a cluster communication channel 112, and may be connected to client computer systems (not shown) via other network communication link(s) (not shown). Each of servers 110A and 110B may be implemented as a standard computer system, having a processor (not shown) to execute computer instructions, an operating system (not shown), a memory to store the computer instructions, shown here as memory 120A and 120B, and other components as are known in the art. Production server 110A is shown as executing application instance 130A. Secondary server 110B is not executing an instance of the application, but is assumed to be capable of executing such an application instance if production server 110A should fail.

To facilitate recovery in the event of failure, a checkpoint service 132A is used by application instance 130A to save the state of the application. In the example shown, checkpoint data are saved in memory 120A as primary checkpoint image 140A. Checkpoint service 132A provides application program interfaces (APIs) and infrastructure for application instances to record the state of the application at given points in time.

The state of the application includes data being used by application instance 130A executing on production server 110A and other information relevant to the server state (values of in-memory variables, etc.). The state of the application instance is referred to herein as a checkpoint. A checkpoint can be made up of consecutive or non-consecutive system memory pages. A checkpoint can be saved in a distributed shared memory (DSM) segment, where each node sharing the checkpoint has a complete copy of the distributed shared memory segment. In an implementation using DSM segments, a checkpoint service such as checkpoint service 132 replicates DSM segments on multiple backup nodes for fault tolerance reasons. The terms 'checkpoint' and 'checkpoint image' are used herein to refer to both in-memory checkpoints and distributed shared memory (DSM) segments, and the scope of the invention includes both techniques of saving the state of the application, as well as other comparable techniques. The term 'writer node' is used to describe a node in a cluster or network that updates the state of the application by, for example, executing an application instance that writes data or in-memory variables.

Checkpoint service 132A ensures that replicas of the checkpoint data on other nodes in cluster 102 are consistent with the state of application instance 130A recorded on production server 110A. If production server 110A should fail, a replica of the checkpoint data can be retrieved from another node in the cluster (in this case secondary node 110B). Another application instance can be started on secondary server 110B, resuming execution from the state that was recorded in the replica checkpoint data on secondary node 110B.

In the example of FIG. 1, updates to the state of the application by application instance 130A are made directly to the in-memory primary checkpoint image 140A. In one embodiment, an application instance performs a "memory mapping" of a buffer in application process address space to a checkpoint image in kernel memory. Memory mapping enables a write to the application buffer to be made directly made to a checkpoint image in system memory, such as to primary checkpoint image 140A. An application buffer can also be memory-mapped to a DSM segment. Memory mapping enables overhead to be minimized in accessing and updating checkpoint images.

Periodically, application instance 130A commits updates and copies of local committed checkpoint images in cluster 102 are updated, including local committed checkpoint images 150A and 1506. For an application instance on one node to have access to an update made on another node, the node performing the update commits the update. Committed checkpoint images, such as local committed checkpoint images 150A and 150B, include only those updates that have been committed.

The committed checkpoint image is saved as a persistent checkpoint image, shown in FIG. 1 as a checkpoint image snapshot 170. In this example, checkpoint image snapshot 170 is maintained by a persistent checkpoint image snapshot module 175 in memory 120A of production server 110A. At the time the persistent checkpoint image snapshot is created, the persistent checkpoint image snapshot module 175 makes an on-disk copy of the local committed checkpoint image 150A, i.e., a snapshot 170 is created. Each snapshot is associated with a unique transaction identifier number 152. In one embodiment of the invention, each time the persistent image snapshot is created, the snapshot 170 is saved along with its transaction identifier number 152 within a disk drive 172 that is organized by a file system or volume manager (not shown, but well-known and generally executed as an application stored in memory of one or more servers). Multiple snapshots 170 may be saved on the disk 172 such that a snapshot 170 does not overwrite a previous snapshot. Thus, a series of snapshots 170 are created and maintained. Although in one embodiment of the invention, the snapshots 170 are created each time a change occurs in the local committed checkpoint image 150A. In other embodiments, the snapshots may be created on a periodic schedule without regard for the changes in the image 150A.

Checkpoint image snapshots 170 are preferably created asynchronously, so that the performance of applications updating the in-memory checkpoint images is not slowed by write operations to disk. As a result, checkpoint image snapshot 170 may lag behind the in-memory checkpoint images, such as primary checkpoint image 140A and local committed checkpoint images 150A and 150B. A node in a cluster or network that is responsible for creating the snapshots is referred to herein as an 'updater node.' In this example, production server 110A operates as an updater node and executes a persistent checkpoint image snapshot module 175. One of skill in the art will recognize that the functionality of persistent checkpoint image snapshot module 175 may be implemented in various ways, such as part of checkpoint service 132A, as a module or instructions running on a separate updater node, or as software or firmware of a storage appliance.

Bitmap 160A is a bitmap with one bit for each portion of memory in committed checkpoint image 150A. The term 'portion of memory' is used to describe a unit of memory, such as a block or a region; different implementations may use portions of different sizes. Bitmap 160A is used to enhance performance of maintaining of a persistent checkpoint image by indicating portions of committed checkpoint image 150A that have changed (i.e., been updated or newly-written) since the most recent snapshot 170. For example, a value of '1' may be used to indicate that the corresponding portion of committed checkpoint image 150A has changed since the most recent snapshot 170 was created. A value of '0' may be used to indicate that the corresponding portion of committed checkpoint image 150A has not changed since the most recent snapshot 170 was created. The appropriate bit(s) of bitmap 160A are set with every commit operation.

Bitmap 160A therefore enables the updated portions of local committed checkpoint images to be used to create the checkpoint image snapshot 170 without copying the entire local committed checkpoint image. Additionally, the bitmap 160A can be used to limit the amount of data stored in the snapshots 170 to only the data that has changed from the prior snapshot. One of skill in the art will recognize that bitmap 160A may be implemented in other ways, such as a table, a database, or other in-memory data structure. In addition, while bitmap 160A enhances performance of updating the persistent checkpoint image, local committed checkpoint image 150A may be copied in its entirety to persistent data storage 172 and used as a snapshot 170 without use of such a performance-enhancing feature and without departing from the scope of the invention.

To summarize the commit operation, when application instance 130A commits an update, checkpoint service 132A updates primary checkpoint image 140A and local committed checkpoint image 150A. Checkpoint service 132A then copies changes from local committed checkpoint image 150A to update the local committed checkpoint image 150B on secondary server 110B. Each updated portion of local committed checkpoint image 150A is marked in bitmap 160A to show that the respective portions have changed since creation of the most recent snapshot 170. Periodically, bitmap 160A is used to identify portions of the local committed checkpoint image 150A that have changed since the last snapshot 170, and the changed portions of are used to create a new snapshot 170. Alternatively, a snapshot 170 may be created when each change occurs in bitmap 160A. The snapshots 170 form a persistent checkpoint image that can be used to restore or rollback the server 110A.

Figure 2:
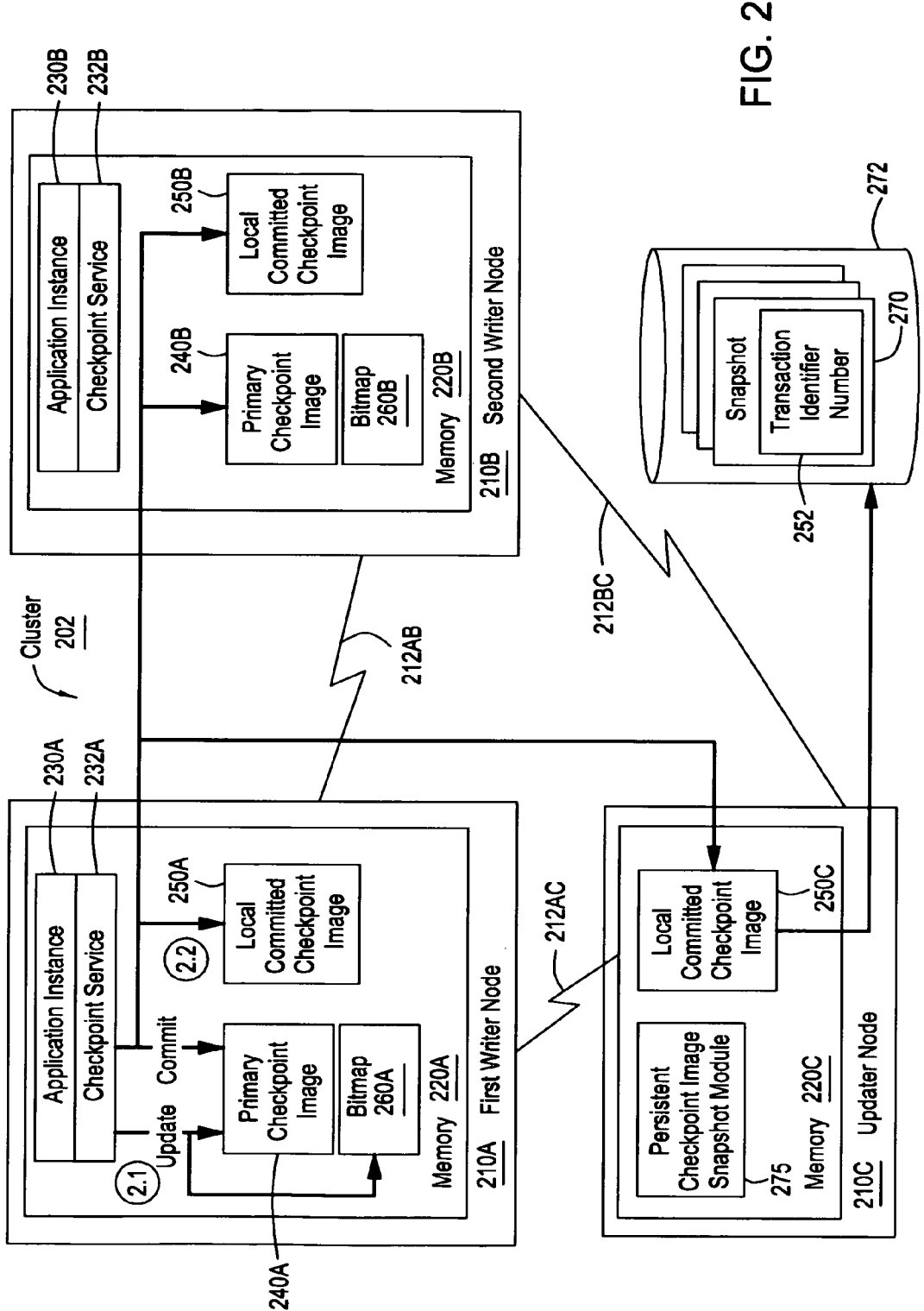
FIG. 2 is a diagram showing an update transaction and a commit transaction in an environment having two application instances that can update the state of an application (executing on nodes referred to as writer nodes) and an updater node to maintain a persistent checkpoint image and snapshots of committed checkpoint data in accordance with one embodiment of the invention.

FIG. 2 is a diagram showing an update transaction and a commit transaction in an environment having two application instances that can update the state of an application (executing on nodes referred to as writer nodes) and an updater node to maintain the persistent checkpoint image. As described earlier, a writer node includes an application instance that can update the state of the application, and an updater node maintains a persistent checkpoint image. In FIG. 2, a writer node is illustrated by first writer node 210A and second writer node 2106, and an updater node is illustrated by updater node 210C.

Servers in cluster 202 are connected via a cluster communication channel having portions 212AB, 212BC, and 212AC. Nodes in cluster 202 may be connected to client computer systems (not shown) via other network communication link(s) (not shown). First writer node 210A performs operations similar to those described with reference to production server 110A of FIG. 1. First writer node 210A executes application instance 230A, which uses checkpoint service 232A in a manner similar to that described with reference to checkpoint service 132A of FIG. 1. Memory 220A of first writer node 210A includes primary checkpoint image 240A, local committed checkpoint image 250A, and bitmap 260A.

Second writer node 210B also performs operations similar to those described with reference to production server 110A of FIG. 1. Second writer node 210B also is a writer node, and therefore has an application instance 230B, which uses checkpoint service 232B. In addition, memory 220B includes a primary checkpoint image 240B, a local committed checkpoint image 250B, and a bitmap 260B to track changes to data and/or the state of the application made by application instance 230B. Because both first writer node 210A and second writer node 210B can update data and the state of the application, write operations of application instances 230A and 230B are synchronized to avoid overlapping write operations to the same portion of the primary checkpoint image. Such synchronization can be performed by distributed synchronization operations such as locking, as are known in the art.

The persistent checkpoint image snapshot module 275 creates a snapshot 270 of the local committed checkpoint image 250C and marks each of the snapshots 270 with a transaction identifier number 252. The transaction identifier number is indicative of the time each of the snapshots 270 was created. Multiple snapshots 270 associated with transaction identifier numbers 252 (which together form a series of snapshots) are maintained by the updater node 210C so the checkpoint image 250C (or changes thereto) contained within each of the snapshots 270 and associated with a particular transaction identifier number 252 can be used to restore a server state to an earlier point in time associated with the particular transaction identifier number 252.

Figure 3:
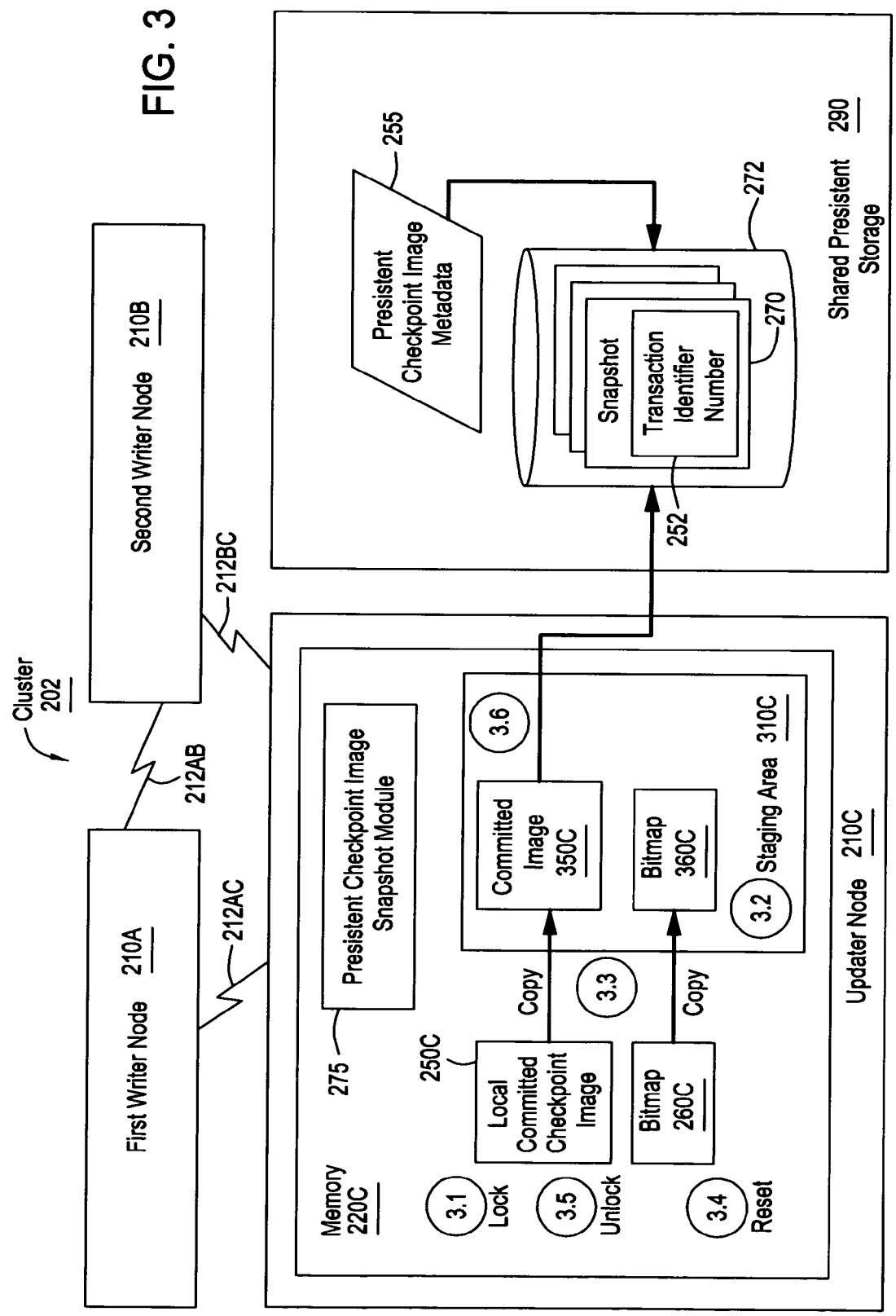
FIG. 3 shows examples of actions that may be taken by one embodiment of the persistent checkpoint image update module when updating a persistent checkpoint image.

In FIG. 3, updater node 210C captures a persistent checkpoint image (snapshot 270) and stores the snapshot 270 in shared persistent storage 290. The shared persistent storage may be a disk array that is conventionally managed by a file system or volume manager. Memory 220C of updater node 210C contains a local committed checkpoint image 250C, bitmap 260C, and persistent checkpoint image snapshot module 275. Because updater node 210C does not execute an application instance in this embodiment, no primary checkpoint image appears in memory 220C. However, in other embodiments of the invention, the updater node may execute an active instance of an application. The operation of updater node 210C and persistent checkpoint image snapshot module 275 is described further with reference to FIGS. 3 and 4 below.

Referring again to FIG. 2, when application instance 230A updates data and/or variables affecting the state of the application, data are written to the in-memory primary checkpoint image 240A, as shown by action 2.1. When application instance 230A commits an update, as shown in action 2.2, instances of the primary checkpoint image 240A on first writer node 210A and primary checkpoint image 240B in memory 220B of second writer node 210B are updated. Note that portions of primary checkpoint image 240B are updated to reflect changes to primary checkpoint image 240A, even though application instance 230B is not committing an update. To enable nodes 210A and 210B to share and independently update the primary checkpoint image, the updating application instance, here application instance 230A, obtains a lock on at least a portion of primary checkpoint image 240A. The lock prevents application instance 230B on second writer node 210B from simultaneously updating the locked portion of primary checkpoint image 240B. However, application instance 230B may simultaneously update other portions of primary checkpoint image 240B for which a lock can be obtained. Checkpoint service 232A on first writer node 210A may operate in conjunction with checkpoint service 232B on second writer node 210B to synchronize the write operations of writer nodes 210A and 210B.

Also in response to commit operation 2.2, all committed checkpoint images in cluster 202 are updated, including local committed checkpoint image 250A on first writer node 210A, local committed checkpoint image 250B on second writer node 210B, and local committed checkpoint image 250C on updater node 210C. In addition, bitmaps 260A, 260B, and 260C are updated to record the portions of the local committed checkpoint images that changed with the update operation. The operation of updater node 210C and persistent checkpoint image snapshot module 275 is described further with reference to FIGS. 3 and 4 below.

After action 2.2 of FIG. 2 is completed, all nodes 210A, 2106, and 210C have consistent local copies of the committed checkpoint image and consistent copies of at least some portions of the primary checkpoint images. (At this point, some portions of the primary checkpoint images can be inconsistent if updates were not quiesced and the primary checkpoint images continued to be updated while the committed checkpoint images were synchronized.) In addition, the bitmaps 260A, 260B, and 260C on nodes 210A, 210B, and 210C are consistent.

FIG. 3 shows examples of actions that may be taken by one embodiment of the persistent checkpoint image snapshot module 275 when updating a persistent checkpoint image (i.e., creating a snapshot 270). In one embodiment, several criteria are considered in creating the checkpoint image snapshot. For example, only committed changes are included in the checkpoint image snapshot. Each node's in-memory checkpoint image is updated in response to a commit operation, and therefore the nodes have consistent copies of the in-memory checkpoint image reflecting the same state of the application after each commit operation. The persistent checkpoint image snapshot module ensures that each commit operation is fully reflected in the snapshot; no partial updates are written to the snapshot. Snapshots are created to reflect the order of commit operations as the state of the application was updated in the local committed copies of the checkpoint image.

In this example, the checkpoint image snapshots 270 are stored in shared persistent storage 290 and maintained by persistent checkpoint image snapshot module 275 in memory 220C of updater node 210C. The current persistent copy of the checkpoint image to be used for recovery purposes is the most recent snapshot 270, as indicated by the persistent checkpoint image metadata 255 in shared persistent storage 290. One of skill in the art will recognize that a copy of persistent image metadata 255 may exist in memory 220C of updater node 210C. The most recent checkpoint image snapshot to be used for recovery purposes is also referred to herein as a recovery checkpoint image. One of skill in the art will recognize that persistent shared storage 290 may be implemented as a shared device or as a file and can be shared by all nodes in cluster 202. (Communication links from nodes 210A, 210B, and 210C to persistent shared storage 290 are not shown.) The shared persistent storage may be any form of storage including, but not limited to, one or more disk drives, optical drives, semiconductor storage, and the like. The storage is conventionally managed by a file system or volume manager (not shown) that is executed in a well-known manner by one or more of the nodes.

In FIG. 3, a synchronization thread (not shown) is started by persistent checkpoint image snapshot module 275 on updater node 210C to create checkpoint image snapshot in persistent storage 290. The synchronization thread is directed by persistent checkpoint image snapshot module 275 to perform actions 3.1 through 3.5 in FIG. 3. One of skill in the art will recognize that all of these actions need not be performed by a single thread or instance of a persistent checkpoint image update module. Furthermore, other computer-executable instructions or means for performing the functionality described in actions 3.1 through 3.5 in FIG. 3 are within the scope of the invention.

Referring to FIG. 3, in action 3.1, the local committed checkpoint image 250C on updater node 210C is locked. First writer node 210A and second writer node 210B may continue to operate normally, updating primary checkpoint images 240A and 240B of FIG. 2 (not shown in FIG. 3), respectively, and issuing commit operations. If a commit operation occurs while the persistent checkpoint image is being updated, updater node 210C buffers the data for the commit operation until the local committed checkpoint image 250C is unlocked.

After locking the committed copy of the checkpoint image, in action 3.2, an in-memory staging area 310C is created in memory 220C of updater node 210C. In action 3.3, local committed checkpoint image 250C is copied into staging area 310C as committed image 350C and bitmap 260C is copied to staging area 310C as bitmap 360C. In action 3.4, bitmap 260C is reset and, in action 3.5, local committed checkpoint image 250C is unlocked. Any buffered commit operations are performed after the local committed checkpoint image 250C is unlocked.

In the embodiment shown, the most-recently created checkpoint image snapshot is designated as the persistent checkpoint image to be used for recovery operations. At this point, persistent checkpoint image metadata 255 points to checkpoint image snapshot 270 as the current consistent checkpoint image to be used for recovery operations (i.e., the most recent checkpoint image snapshot has the most recent creation time). After creating committed image 350C and bitmap 360C in staging area 310C, the persistent checkpoint image snapshot module 275 on updater node 210C continues with action 3.6, and creates a snapshot 270 of the image 350C. The snapshot 270 is stored in shared persistent storage 290. Each snapshot 270 is associated with a transaction identifier 152 such that a series of snapshots is maintained in the storage 290. More specifically, once a snapshot is successfully created, the snapshot module 275 atomically writes the metadata 255 on the storage 290. The metadata 255 may include (transaction_id, time_info, particular_dirty_blocks_in_this_whole_snapshot). The result is a list of snapshots that are atomically created along with corresponding metadata that describes transaction_id, time_of_creation, and the like.

Figure 4:
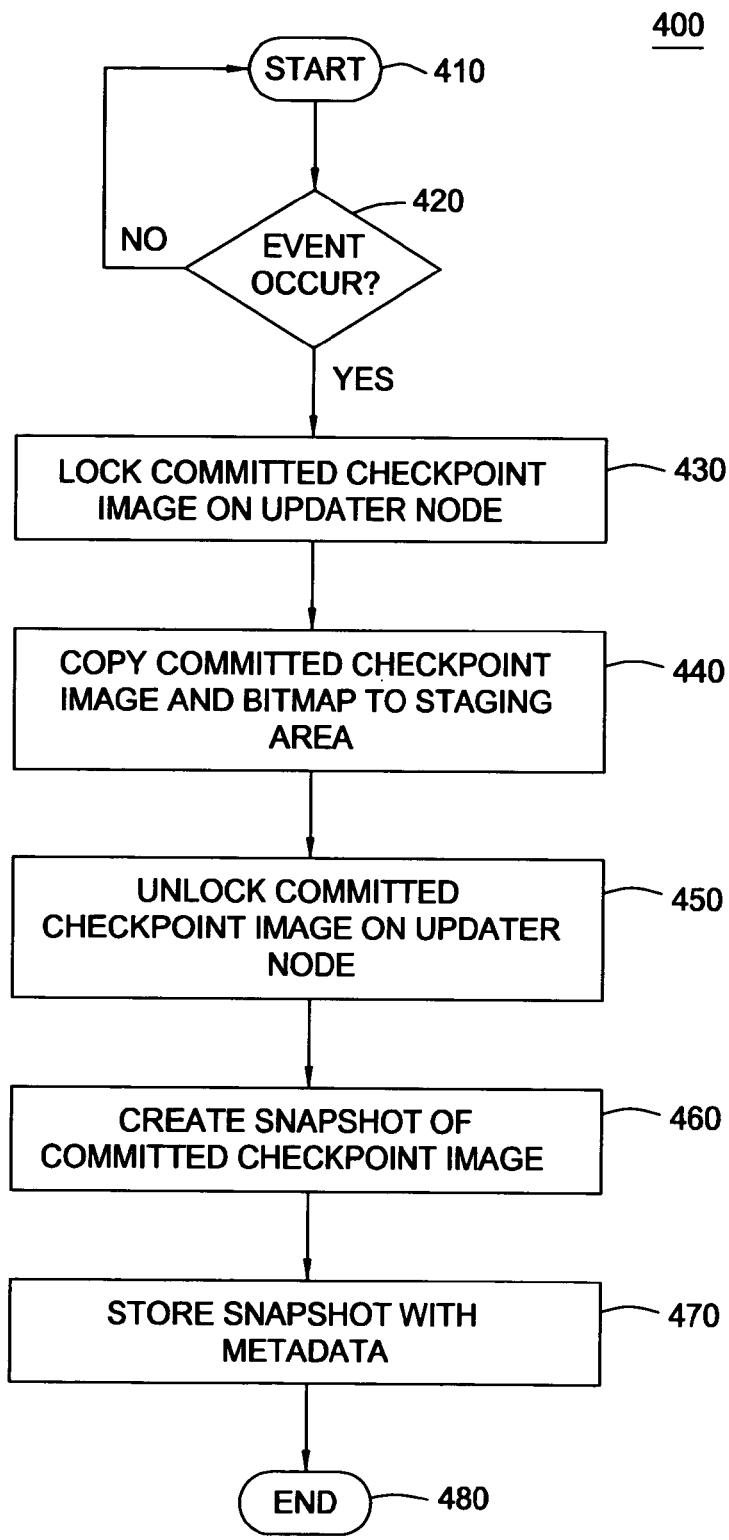
FIG. 4 is a flow diagram showing operation of a persistent image update module in maintaining a persistent checkpoint image and snapshots of committed checkpoint data in accordance with one embodiment of the invention.

FIG. 4 is a flow diagram showing operation of one embodiment of a persistent checkpoint image snapshot module 275 in accordance with one embodiment of the invention. Operation of the updater node to create the checkpoint image snapshots can be triggered by one of several events. Examples of such events include lapsing of a regular time interval for creating the snapshots, performing a specified number of commit operations including after every commit, or issuing a direct command to update the persistent files. The events triggering creation of a snapshot can be established to meet service level agreement parameters, such as recovery point objectives (RPO) and/or recovery time objectives (RTO) set by an administrator. Operation of the updater node can also be triggered by other types of events that relate to the state of the application without departing from the scope of the invention.

The process 400 starts at 410 and proceeds to 420, where events are shown in "Event Occurs" decision point 420. If no such event occurs, the updater node remains in a "wait state," continuing to await an event that will trigger creating a checkpoint image snapshot as a persistent checkpoint image. This wait state is indicated by the "no" branch returning to the start point 410. (Other operations on updater node 210C that are unrelated to creating the checkpoint image snapshot may continue to occur even though updater node 210C is in wait mode for updating the persistent checkpoint image.) When such an event occurs at decision step 420, the method 400 proceeds to "Lock Committed Checkpoint Image on Updater Node" step 430. Locking the committed checkpoint image on the updater node ensures that commit operations do not change the committed checkpoint image until a snapshot can be made. The method 400 then proceeds to "Copy Committed Checkpoint Image and Bitmap to Staging Area" step 440, which was described with reference to FIG. 3 action 3.3. Once the committed checkpoint image and bitmap are in the staging area, control proceeds to "Unlock Committed Checkpoint Image on Updater Node" step 450. Because the copy of the committed checkpoint image is now captured in the staging area, the lock can be released and applications can continue to operate normally while the persistent copy is being updated.

After the committed checkpoint image is unlocked at "Unlock Committed Checkpoint Image on Updater Node" step 450, the method 400 proceeds to step 460 to create a snapshot of the committed checkpoint image. In this embodiment, the snapshot contains a complete copy of the committed checkpoint image. In an alternative embodiment, the method 400 uses the bitmap to identify changed portions of the committed checkpoint image. The method creates a snapshot containing only the changes that have occurred since the last snapshot. At step 470, the metadata related to the snapshot and the snapshot are stored in the shared persistent storage. The method 400 ends at step 480.

The flowchart of FIG. 4 describes normal operation of the updater node in creating and maintaining the snapshots of the committed checkpoint image. One of skill in the art will recognize that all of these actions need not be performed by a single thread or instance of a persistent checkpoint image update module. Furthermore, other computer-executable instructions or means for performing the functionality described in the flowchart in FIG. 4 are within the scope of the invention.

Figure 5:
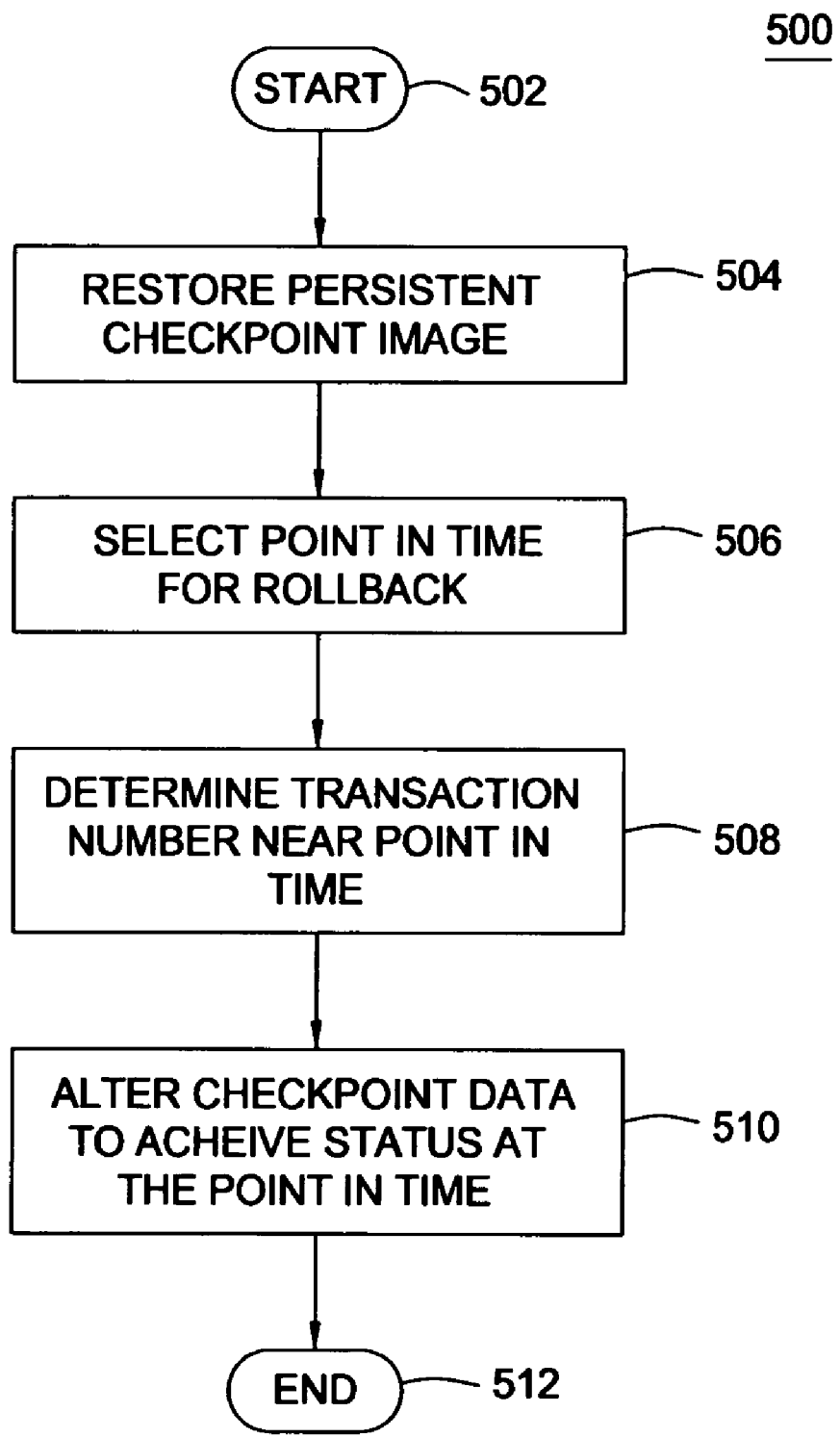
FIG. 5 is a flow diagram showing restoration of an application state when a production server fails or an end user chooses to rollback an application state to an earlier point in time in accordance with one embodiment of the invention.

FIG. 5 depicts a flow diagram of a method 500 of using the snapshots of the committed checkpoint image to rollback a server to an earlier state. Such a rollback may be necessary to restore a server after a failure, or the rollback may be elected by an user to restore an application to an earlier state. The method 500 begins at step 502 and proceeds to step 504 where the current persistent checkpoint image is restored, i.e., the image is copied to memory within the server. At step 506, a user selects a point in time for the rollback. At step 508, the point in time is mapped to a transaction number representing a snapshot taken nearest the point in time. Generally, the snapshot taken prior to the point in time is selected.

At step 510, starting with the most recent snapshot, if necessary, the method alters the checkpoint data in memory to match the current snapshot. If the snapshots contain only changes that occurred since a a prior snapshot, then each snapshot, in reverse order in which they were created, is used to alter the checkpoint data. After the snapshot prior to the selected point in time is used to alter the checkpoint data in memory, the server is restored to the selected point in time and, thus, has been rolled back in accordance with the invention. Alternatively, the "base" checkpoint data may be the data prior to the changes recorded in the snapshots. In that case, the base checkpoint data is used as the committed data and then the data is rolled forward using the snapshots until the desired state is obtained. After the snapshot after the selected point in time is used to alter the checkpoint data in memory, the server is restored to the selected point in time and, thus, has been rolled back in accordance with the invention. If the snapshots contain an entire checkpoint image (rather than just the changes relative to a prior snapshot), the appropriate snapshot can be accessed and used as the committed checkpoint image within the server to be restored to an earlier time. The method 500 ends at step 512.

The persistent checkpoint image can be used for recovery in the event of application, node, cluster, or communication link failure. In addition, the persistent checkpoint image can be used to initialize the in-memory checkpoint image of the state of the application when a new node joins the distributed computing environment or cluster or to return an application state to a particular point in a time. These other uses of the persistent checkpoint image are described below.

If the updater node fails, a new updater node can be chosen from the nodes remaining in the cluster. Before beginning operation, the new updater node performs a recovery operation. During recovery, the local committed copy of the checkpoint image on the new updater node is locked and copied to a staging area, similar to the process described above with reference to FIG. 3. The entire local committed copy of the checkpoint image in the staging area is then written to a snapshot. Additionally, the checkpoint image may be rolled back using the snapshots that represent a historical record of the checkpoint images.

If all nodes managing checkpoint images fail, the first node to resume operation can recover from the latest snapshot image from disk. The latest snapshot serves as a persistent checkpoint image from which the node begins operation. The bitmap tracking changes between the committed version and the latest snapshot version is reset, and operations resume.

Another embodiment uses memory mapping in place of one or both of the in-memory checkpoint images (e.g., the primary checkpoint image 140A and local committed checkpoint image 150A of FIG. 1). In this implementation, memory is allocated to hold updates to the checkpoint image, rather than memory being allocated to hold the entire checkpoint image.

An alternative embodiment also saves memory in storing in-memory checkpoint images. Since the updater node regularly synchronizes the in-memory committed checkpoint image with the persistent checkpoint image, only one in-memory checkpoint image is maintained. A writer node keeps copies of the dirty blocks in a tree-like structure. Once these dirty blocks are copied to a snapshot, the corresponding dirty block tree entries are removed. Only writer nodes maintain dirty block tree structures.

In yet another embodiment, the persistent checkpoint image is used as the source of the state of the application for initializing a node. For example, when a new node joins the cluster, a copy of most recent snapshot is provided to the new node. Initializing the new node can be performed by copying one of the local in-memory committed checkpoint images to the new node. However, if the checkpoint image is large, this process can be slow and consume excessive communication bandwidth.

mom An alternative to copying the in-memory checkpoint image to the new node keeps a persistent image of only the committed changes to the checkpoint image. When a new node joins the cluster, the new node obtains a read lock and reads the most recent checkpoint image snapshot to obtain a baseline version of the checkpoint image. The new node contacts the updater node to obtain changes that have not yet been used in a snapshot. While the new node is creating the in-memory checkpoint image, the new node buffers all incoming commit requests received from an application instance. Once the in-memory checkpoint image is constructed, the new node applies the buffered commit requests to its local committed checkpoint image. By combining the baseline checkpoint image with the changes made by commit operations after the most recent checkpoint image snapshot, the new node constructs a current version of the checkpoint image that is consistent with the in-memory checkpoint images of other nodes in the environment.

The present invention provides many advantages. Saving persistent checkpoint images greatly speeds recovery from failure of the entire cluster. Applications can be restarted in a consistent state that was recorded prior to failure, enabling seamless recovery and resumption of operations with minimal loss of data and downtime. Maintaining a number of back up copies of the persistent check point images also allows a user to return an application to an earlier known state at the time those checkpoint images were created. Persistent checkpoint images can be maintained with little or no effect on performance of applications.

While the foregoing is directed to embodiments of the present invention, other and further embodiments of the invention may be devised without departing from the basic scope thereof, and the scope thereof is determined by the claims that follow.

The invention claimed is:

1. A method comprising:
    updating a first checkpoint image, responsive to a first change made by a first instance of an application executing on a plurality of nodes, wherein the first instance of the application is executing on a first node of the plurality of nodes, wherein the first checkpoint image is maintained at the first node, and wherein the first checkpoint image comprises a first state of the first instance of the application;
    updating, responsive to a second change committed by any of the first instance of the application and at least one other instance of the application executing on at least one other node of the plurality of nodes, a second checkpoint image maintained at a distributed shared memory shared by the plurality of nodes wherein the distributed shared memory propagates the second checkpoint image to the plurality of nodes, and wherein the second checkpoint image comprises a second state of any of the first and the at least one other instances of the application;
    creating, from at least a portion of the distributed shared memory and in response to the second change, a checkpoint-image snapshot comprising data indicative of the second state of any of the first and the at least one other instances of the application; and
    storing the checkpoint-image snapshot on at least one node of the plurality of nodes.

2. The method of claim 1, wherein storing the checkpoint-image snapshot comprises: storing the checkpoint-image snapshot along with at least one other checkpoint-image snapshot stored on at least one node at an earlier time, and wherein the data indicative of the second state comprises: at least one difference between the checkpoint-image snapshot and the at least one other checkpoint-image snapshot.

3. The method of claim 1, further comprising: executing any of the first and the at least one other instances of the application in accordance with the checkpoint-image snapshot.

4. The method of claim 1, wherein storing the checkpoint-image snapshot comprises: storing, at the at least one node, a transaction identifier number corresponding to the checkpoint-image snapshot.

5. The method of claim 2, further comprising: executing any of the first and the at least one other instances of the application in accordance with any of the checkpoint-image snapshot and the at least one other checkpoint-image snapshot.

6. The method of claim 5, wherein respective transaction identifiers are associated with the checkpoint-image snapshot and the at least one other checkpoint-image snapshot, and wherein executing any of the first and the at least one other instances of the application comprises: using at least one of the transaction identifiers to select any of the checkpoint-image snapshot and the at least one other checkpoint-image snapshot.

7. The method of claim 5, wherein executing any of the first and the at least one other instances of the application comprises: performing any of a rollback or roll-forward using any of the checkpoint-image snapshot and the at least one other checkpoint-image snapshot.

8. The method of claim 1, wherein the data indicative of the second change comprises the second state of the application.

9. The method of claim 2, further comprising: updating, responsive to the second change, a bitmap to reflect that at least one portion of the second checkpoint image differs from the at least one other checkpoint-image snapshot.

10. The method of claim 1, wherein:
   updating the second checkpoint image comprises:
      updating, at a first node of the plurality of nodes, in response to the second change being committed by the first instance of the application, a first instance of the second checkpoint image, wherein the first instance of the second checkpoint image comprises a first instance of the second state; and
      updating, at the at least one other node, in response to the second change being committed by the at least one other instance of the application, a second instance of the second checkpoint image, wherein the second instance of the second checkpoint image comprises a second instance of the second state; and
   creating the checkpoint-image snapshot comprises:
      creating, from at least a portion of the distributed shared memory and in response to the second change, a first checkpoint-image snapshot comprising data indicative of the first instance of the second state; and
      creating, from at least a portion of the distributed shared memory and in response to the second change, a second checkpoint-image snapshot comprising data indicative of the second instance of the second state; and
   storing the checkpoint-image snapshot comprises: storing the first and second checkpoint-image snapshots on the at least one node of the plurality of nodes.

11. An apparatus comprising:
   means for updating a first checkpoint image, responsive to a first change made by a first instance of an application executing on a plurality of nodes, wherein the first instance of the application is executing on a first node of the plurality of nodes, wherein the first checkpoint image is maintained at the first node, and wherein the first checkpoint image comprises a first state of the first instance of the application;
   means for updating, responsive to a second change committed by any of the first instance of the application and at least one other instance of the application executing on at least one other node of the plurality of nodes, a second checkpoint image maintained at a distributed shared memory shared by the plurality of nodes wherein the distributed shared memory propagates the second checkpoint image to the plurality of nodes, and wherein the second checkpoint image comprises a second state of any of the first and the at least one other instances of the application;
   means for creating, from at least a portion of the distributed shared memory and in response to the second change, a checkpoint-image snapshot comprising data indicative of the second state of any of the first and the at least one other instances of the application; and
   storage for storing the checkpoint-image snapshot.

12. The apparatus of claim 11, wherein said storage stores the checkpoint-image snapshot along with at least one other checkpoint-image snapshot stored at an earlier time, and wherein the data indicative of the second state comprises: at least one difference between the checkpoint-image snapshot and the at least one other checkpoint-image snapshot.

13. The apparatus of claim 12, further comprising: a means for executing any of the first and the at least one other instances of the application in accordance with any of the checkpoint-image snapshot and the at least one other checkpoint-image snapshot.

14. The apparatus of claim 11, further comprising: means for executing any of the first and the at least one other instances of the application in accordance with the checkpoint-image snapshot.

15. The apparatus of claim 11, wherein the storage stores the checkpoint-image snapshot along with a transaction identifier number corresponding to the checkpoint-image snapshot.

16. The apparatus of claim 13, wherein respective transaction identifiers are associated with the checkpoint-image snapshot and the at least one other checkpoint-image snapshot, and wherein the means for executing any of the first and the at least one other instances of the application comprises: a means for using at least one of the transaction identifiers to select any of the checkpoint-image snapshot and the at least one other checkpoint-image snapshot.

17. The apparatus of claim 11 wherein the storage comprises a disk drive.

18. The apparatus of claim 11 wherein the storage is managed by a file system or volume manager.

19. The apparatus of claim 11, wherein the data indicative of the second change comprises the second state of the application.

20. The apparatus of claim 12, further comprising: a means for updating, responsive to the second change, a bitmap to reflect that at least one portion of the second checkpoint image differs from the at least one other checkpoint-image snapshot.

* * * * *